(12) United States Patent
Lowson et al.

(10) Patent No.: US 7,681,505 B2
(45) Date of Patent: Mar. 23, 2010

(54) STATION DESIGN FOR PERSONAL RAPID TRANSPORT SYSTEMS

(75) Inventors: Martin V. Lowson, Bristol (GB); Christopher V. Cook, Warkshire (GB); David G. Hughes, Bristol (GB)

(73) Assignee: Advanced Transport Systems, Ltd., Bristol (GB)

( * ) Notice: Subject to any disclaimer, the term of this patent is extended or adjusted under 35 U.S.C. 154(b) by 667 days.

(21) Appl. No.: 10/552,167

(22) PCT Filed: Apr. 13, 2004

(86) PCT No.: PCT/GB2004/001594

§ 371 (c)(1),
(2), (4) Date: Nov. 13, 2006

(87) PCT Pub. No.: WO2004/089679

PCT Pub. Date: Oct. 21, 2004

(65) Prior Publication Data

US 2007/0137513 A1    Jun. 21, 2007

(30) Foreign Application Priority Data

Apr. 10, 2003    (GB) ................................. 0308330.0

(51) Int. Cl.
*B61B 1/00*    (2006.01)
(52) U.S. Cl. .......................................... 104/28; 104/27
(58) Field of Classification Search ................... 104/27, 104/28, 29, 30, 31
See application file for complete search history.

(56) References Cited

U.S. PATENT DOCUMENTS 4,027,596 A * 6/1977 Nardozzi, Jr. ............ 104/138.1
4,061,089 A * 12/1977 Sawyer ...................... 104/23.2
5,590,603 A * 1/1997 Lund ....................... 104/88.04
5,590,604 A * 1/1997 Lund ....................... 104/88.04
5,598,783 A * 2/1997 Lund ....................... 104/88.04
5,813,349 A * 9/1998 Jensen ......................... 104/28

(Continued)

FOREIGN PATENT DOCUMENTS

CH    679296 A5 *    1/1992

(Continued)

OTHER PUBLICATIONS http://web.presby.edu/~jtbell/transitt/SanFrancisco/BART, Jun. 1997.*

(Continued)

*Primary Examiner*—S. Joseph Morano
*Assistant Examiner*—Jason C Smith
(74) *Attorney, Agent, or Firm*—MH2 Technology Law Group (57) ABSTRACT

A station (2) in a personal rapid transit system has a platform (14), the edge of which defines bays (20) for parked vehicles (10). The parked vehicles are out of the path of travelling vehicles moving in a transit path extending between an entry section (4) and an exit section (6). The bays (10) include parking sections (22) alongside which the vehicles may park to enable easy transfer of passengers into and out of the vehicles. The disposition of the parking sections (22) allows the steered vehicles (10) to park close to the platform edge. The stations comprise bypass tracks (36) branched off the main track (30) and disposed in various configurations.

23 Claims, 5 Drawing Sheets

U.S. PATENT DOCUMENTS

| | | | | |
|---|---|---|---|---|
| 6,279,483 B1 * | 8/2001 | Murray et al. | ................. | 104/29 |
| 6,321,657 B1 * | 11/2001 | Owen | ......................... | 104/119 |
| 6,439,128 B1 * | 8/2002 | Miller et al. | .................. | 104/27 |
| 7,047,888 B2 * | 5/2006 | Richards | ...................... | 104/28 |
| 2007/0137513 A1 * | 6/2007 | Lowson et al. | ................ | 104/28 |

FOREIGN PATENT DOCUMENTS

| | | |
|---|---|---|
| FR | 2 262 619 | 9/1975 |
| GB | 1 342 987 | 1/1974 |
| GB | 1 476 783 | 6/1977 |
| GB | 2384223 A * | 7/2003 |
| GB | 2400359 A * | 10/2004 |
| JP | 58-212529 | 12/1983 |
| JP | 10-35486 | 2/1998 |
| JP | 11-209926 | 8/1999 |
| JP | 11209926 A * | 8/1999 |

OTHER PUBLICATIONS

"Bay Area Rapid Transit (BART)", Presbyterian College > Academic Web Server > Jon Bell > Transit > (Cities | Types) > San Francisco > BART, 2 pages.

* cited by examiner

STATION DESIGN FOR PERSONAL RAPID TRANSPORT SYSTEMS

This invention relates to the design of stations in a personal rapid transport system.

In general, a personal rapid transport (PRT) system comprises a dedicated guideway or track on which individual vehicles travel between stations. Each vehicle contains only one passenger or group of passengers, and the vehicle travels continuously between the starting point and the destination without stopping at any intermediate stations. PRT systems thus provide a compromise between a conventional mass transport system such as buses, trains and metro systems, and individual passenger cars.

An example of a PRT system is disclosed in U.S. Pat. No. 4,061,089. In that system, a station is provided on a bypass guideway branched off the main guideway. Lateral bays or "slots" extend from the bypass guideway. Vehicles enter these slots to drop off or pick up passengers. While in the slots, the vehicles do not obstruct other traffic passing along the bypass guideway. However, maneuvering the vehicles in to and out of the slots is not straightforward and requires mechanical handling of the vehicles. While this mechanical handling takes place, the vehicle may obstruct other vehicles travelling along the bypass guideway.

Another difficulty arising in stations is that steered vehicles require a significant distance in which to move close to a platform edge. Consequently, if a station is designed like a conventional railway station, with a single generally straight platform edge, it will not be possible to park vehicles sufficiently close to the platform to achieve a sufficiently narrow gap (for example, of less than 50 mm) to avoid the danger of passengers injuring themselves as they move into or out of the vehicle. This is particularly so if other vehicles are already distributed along the platform.

According to the present invention there is provided a station in a personal rapid transit system, the station comprising a guideway portion bounded on at least one side by a platform, the width of the guideway portion being sufficient for travelling vehicles of the system to travel along a transit path in a normal travel direction of the vehicles unobstructed by vehicles parked against the platform, the platform extending generally parallel to the transit path, and comprising a plurality of bays for receiving parked vehicles, each bay being defined by a respective parking section of the platform edge, which parking section extends obliquely to the transit path, whereby a steered vehicle of the system can move from the transit path; while maintaining a forwards travel direction of the vehicle, to park against the section of the platform edge of a respective one of the bays by turning from the transit path through an acute angle.

The parking section is preferably straight, and may be inclined to the transit path travel direction by an angle of less than 45 degrees. In a preferred embodiment, this angle is in the range of 10 to 20 degrees.

A vehicle entering the station is thus able to turn off the transit path through a relatively small angle and then continue along a substantially straight path to park very close to the parking section, eliminating any substantial gap between the vehicle and the platform.

The bays may be distributed along the platform in a direction parallel to the transit path. The parking sections of adjacent bays may be joined to each other by a transition section which extends from the front end of the parking section of one bay to the rear end of the parking section of the adjacent bay. In this context, "front" and "rear" relate to the normal direction of travel of the vehicles. Thus, in operation, a vehicle entering the bay from the transit path will move parallel to the parking section towards the transition section, and stop with one side of the vehicle adjacent the platform at the parking section.

The transition section may be concavely curved with a radius of curvature greater than the turning circle of the vehicle, so that the vehicle may leave the bay without reversing so as to return to the transit path. Alternatively, the vehicle may perform a relatively short reversing manoeuvre before moving forwards to rejoin the transit path.

The length of the parking sections of the platform edge region is preferably approximately equal to, or perhaps slightly less than, the length of the vehicles of the PRT system.

In a preferred embodiment, the guideway portion, including the transit path, is straight, and the bays are distributed along the platform in a line generally parallel to the guideway portion. The parking sections of the bays are parallel to each other and the perpendicular spacing between them is not less than one vehicle width.

It is desirable for several reasons for the main track of a PRT system to be elevated above ground level. This minimises obstruction to existing road traffic, but also reduces severance by the main track. That is, elevation of the main track does not provide a barrier to vehicles and pedestrians wishing to cross from one side of the track to the other. Elevating the main track avoids the needs for expensive bridges and underpasses.

It is not economically practical for vehicles to stop at stations while on the main track. This would obstruct the flow of other vehicles which may not need to stop at the same station. Consequently, it is known to divert vehicles off the main track on to a bypass track which passes through the station. Vehicles then leave the main track to pass along the bypass track for loading and unloading at the station. Where the main track is elevated, it is conventional for the bypass tracks passing through stations to be at the same level as the main track. This involves considerable capital expense, since the entire station structure needs also to be elevated. Furthermore, measures such as elevators and escalators need to be provided to transport passengers between ground level and the station.

According to a second aspect of the present invention, there is provided a station in a personal rapid transport system comprising a main track along which vehicles of the system travel between a departure station and a destination station, the station being provided on a bypass track which is branched from the main track, the bypass track extending through the station at a level below that of the stretch of the main track which passes the station.

In one embodiment in accordance with this aspect of the present invention, the bypass track departs from, and rejoins, the main track on the same side of the main track, in which case the bypass track, as it extends through the station, is generally parallel to the main track. In an alternative embodiment, the bypass track leaves the main track on one side of the main track and rejoins on the other side. In this embodiment, the station and the bypass track extending through it, are situated beneath the main track.

A platform may be provided on one or both sides of the bypass track as it passes through the station.

According to a third aspect of the present invention, there is provided a personal rapid transit system comprising a main track along which vehicles of the system travel between a departure station and a destination station, the station being provided on bypass tracks which are branched from the main track on opposite sides of the main track, the bypass tracks extending through the station.

A bridge may be provided over the main track, to connect platforms situated beside the bypass tracks. The platforms may, for example, be situated on the sides of the bypass tracks away from the main track.

For a better understanding of the present invention, and to show how it may be carried into effect, reference will now be made, by way of example, to the accompanying drawings, in which:—

Figure 1:
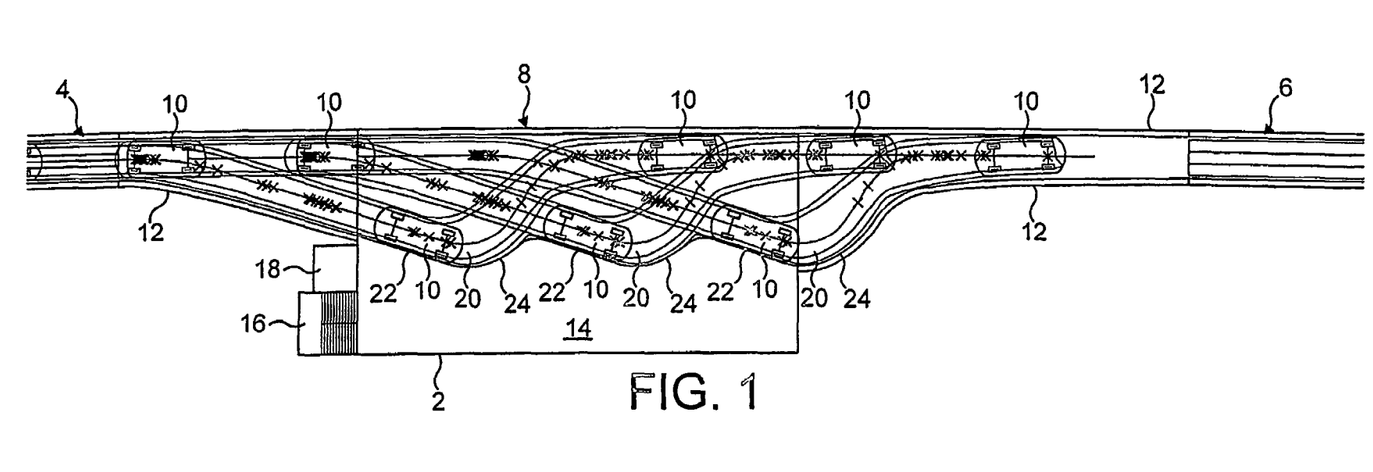
FIG. 1 shows a guideway portion of a personal rapid transport system.

The guideway portion shown in FIG. 1 passes through a station represented by a rectangular boundary 2. The guideway portion includes an entrance section 4 and an exit section 6, which comprise parallel-sided track ways. Between the sections 4 and 6 there is an intermediate section 8 which passes through the station 2. Vehicles 10 are represented in FIG. 1, with moving vehicles shown in relatively faint outline, and stationary vehicles shown in relatively heavy outline. The vehicles have steered front wheels.

The sections 4 and 6 are single-track guideways bounded by walls 12. On one side of the guideway, the wall 12 continues along the intermediate portion 8, but on the other side the wall 12 terminates at the station 2. Within the station 2 there is a platform 14 which is accessible by passengers by means of stairs 16 and a lift 18.

The edge of the platform bounding the intermediate guideway 8 has a scalloped form defining a plurality of bays 20 (three in the embodiment shown in FIG. 1). It will be appreciated that these bays are offset laterally from a notional transit path through the intermediate section 8 in alignment with the sections 4 and 6. Consequently, vehicles 10 parked in the bays 20 will not obstruct vehicles travelling along the transit path to or from one or other of the bays 20.

Each bay 20 is defined by a straight parking section 22 and a transition portion 24 of the edge of the platform 14. The parking sections 22 are parallel to each other and are inclined at an angle of approximately 15° to the direction of the transit path. Each parking section 22 has a length which is approximately equal to that of each vehicle 10, although it will be appreciated that the parking section 22 of the bay 20 nearest to the entry section 4 is extended in order to merge with that section. Thus, as shown in FIG. 1, each bay 20 may be occupied by a single vehicle parked side on to the parking section 22, so that side doors of the vehicle open on to the platform 14. The transition section 24 of each bay 20 extends from the front end of the respective parking section 22 to the rear end of the parking section of the next bay 20 to the front, with the exception of the transition portion of the bay 20 nearest to the exit section 6, which merges into that section.

The oblique orientation of the parking sections 22 means that vehicles 10, steered by their front wheels, can move off the transit path into a bay by a simple turn through 15°, ie the angle of inclination of the parking sections 22 relative to the transit path. The vehicle can then proceed into the bay, stopping with its side not more than 50 mm from the platform edge.

As shown in FIG. 1, the transition sections 24 are concave, and curved with a radius somewhat larger than the radius of the minimum turning circle of the vehicles 10. As a result, a vehicle 10 parked in a bay 20 can leave the bay by moving forwards past the transition section 24 to rejoin the transit path. This manoeuvre is represented for the vehicle 10A in FIG. 2, the travel path of which is shown for a manoeuvre from the transit path at position 10A' to a bay 20 in position 10A" and then returning to the transit path at position 10A'''.

Figure 3:
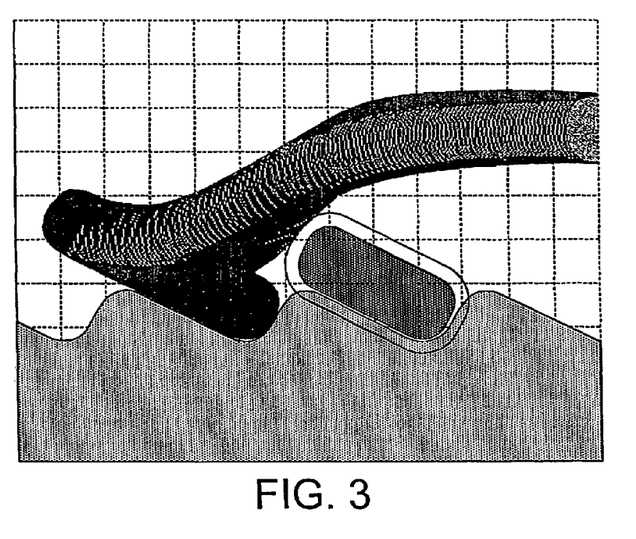
FIG. 3 shows an alternative vehicle travel path.

An alternative manoeuvre is shown in FIG. 3, which appropriate if the bays 20 need to be more closely stacked to increase the capacity of the station 2 without extending its length. In the manoeuvre shown in FIG. 3, the vehicle 10A is reversed slightly from the parked position before moving forwards to rejoin the transit path, while avoiding a vehicle 10B parked in the adjacent bay 20.

Figure 2:
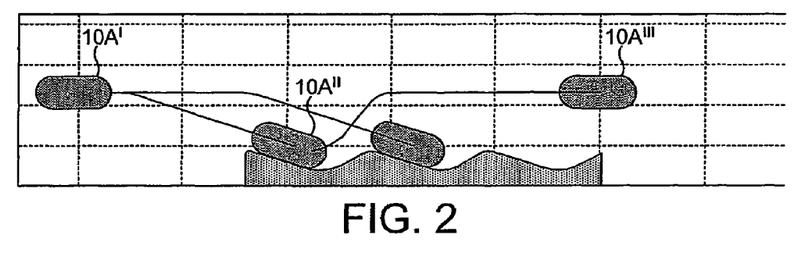
FIG. 2 indicates diagrammatically the travel paths of vehicles entering and leaving the guideway portion shown in FIG. 1.

It should be noted that, in FIGS. 2 and 3, the guideway portion is shown only diagrammatically, without boundary walls such as shown at 12 in FIG. 1.

Figure 4:
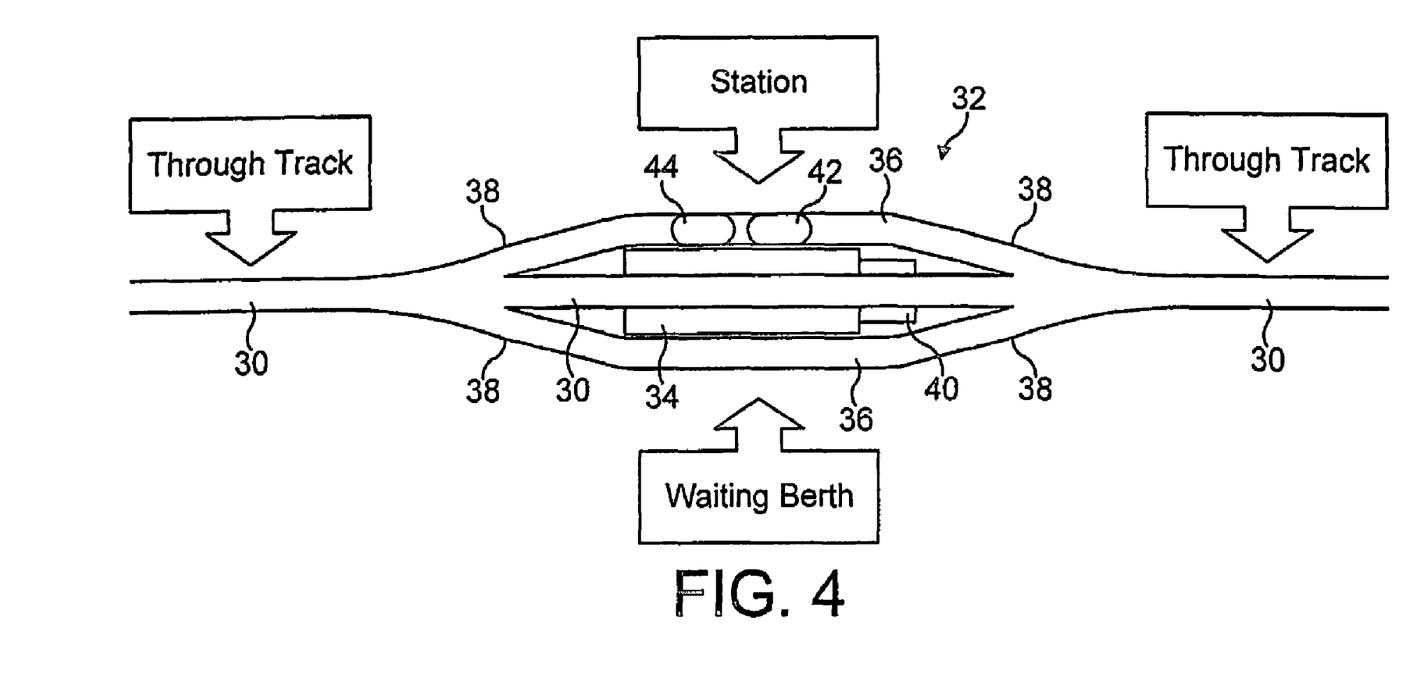
FIG. 4 shows a schematic station configuration.
Figure 5:
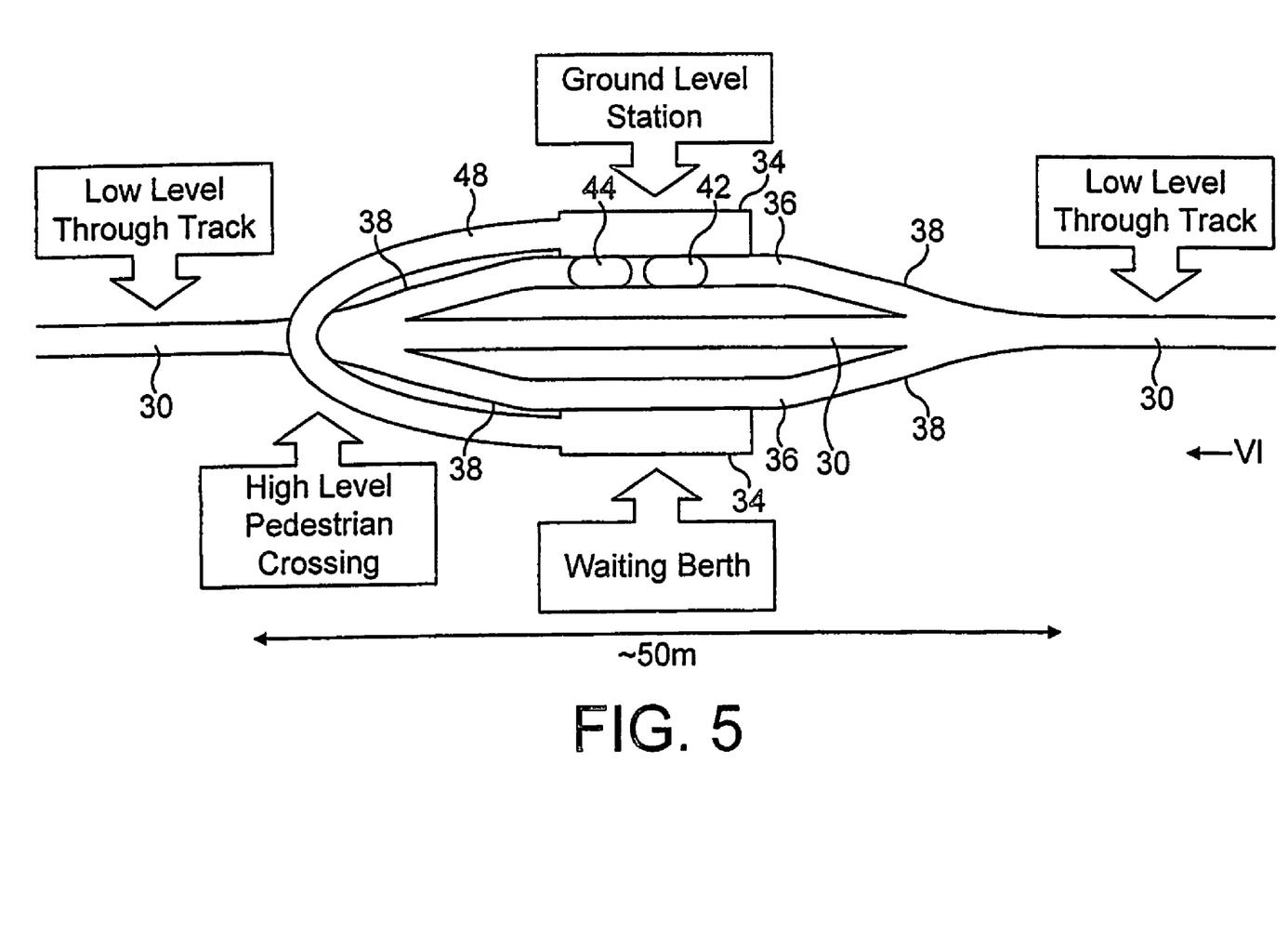
FIG. 5 shows an alternative schematic station configuration.
Figure 6:
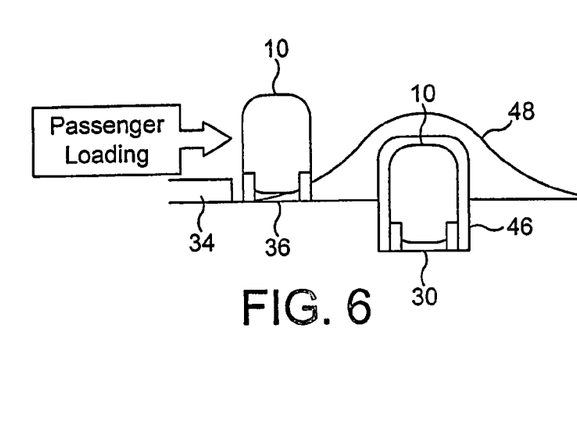
FIG. 6 is a partial view taken generally in the direction of the arrow VI in FIG. 5.

FIGS. 4 to 6 show different embodiments of a station which may or may not include the platform arrangement shown in FIGS. 1 to 3.

With reference to FIG. 4, the PRT system comprises a main through track 30 which is elevated above ground level and runs past a station 32. At the station 32, there is a platform 34 disposed beneath the main track 30. Two branch bypass tracks 36 are branched from the main track 30 and extend past the platform 34 in a direction which is parallel to that of the track 30, with one on each side.

In use, passengers may reach the platform 34 from the ends, after passing underneath portions 38 of the bypass tracks shortly after they leave, or rejoin, the elevated main track 30. At these regions, the bypass track 36 is sloping downwards from the main track 30 towards the level of the platform 34, and consequently there is sufficient headroom for the passage of passengers. The portions 38 on the left of the station as seen in FIG. 4 are used for deceleration of the vehicles 10 after they have left the main track 30. The portions of the bypass track 38 to the right as seen in FIG. 4 are used for acceleration of the vehicles 10 before they rejoin the track 30. Consequently, vehicles travelling along the track 30 past the station may travel at the full normal speed, so minimising congestion on the main track 30.

There may be a lift 40 to provide access to the platform 34 to disabled people, or, in some circumstances, where the platform 34 is situated some level above ground level, but nevertheless beneath the main track 30.

The platform 34, and the bypass tracks 36, may be constructed in the manner disclosed in FIGS. 1 to 3. Alternatively, however, each bypass track may comprise a loading bay 42 and one or more waiting bays 44. In use, passengers embark and disembark from vehicles in the loading bay 42. Any empty vehicles waiting for new passengers will stand in the waiting bay 44. Vehicles entering the station with passengers intending to disembark will be diverted to the bypass track having the shortest wait before reaching the loading bay 42, or alternatively may be permitted to disembark in a waiting bay 44.

The station configuration shown in FIGS. 5 and 6 also comprises a main track 30 and bypass tracks 36, having acceleration and deceleration portions 38. In the station configuration shown in FIGS. 5 and 6, the main track extends approximately at ground level (shown in FIG. 6 in a shallow cutting 46). The bypass track 36 is also substantially at ground level. The platforms 34 of the station shown in FIG. 5 are disposed on the side of the bypass tracks 36 away from the main track 30. Consequently, passengers arriving at the station to transfer to a vehicle 30 can approach from either side without needing to cross either the main track 30 or the bypass tracks 36. However, a bridge 48 may be provided extending between the platforms 34 and passing over the main track 30 at a position before (or after) that at which the bypass tracks 36 branch off (or rejoin) the main track 30.

Figure 7:
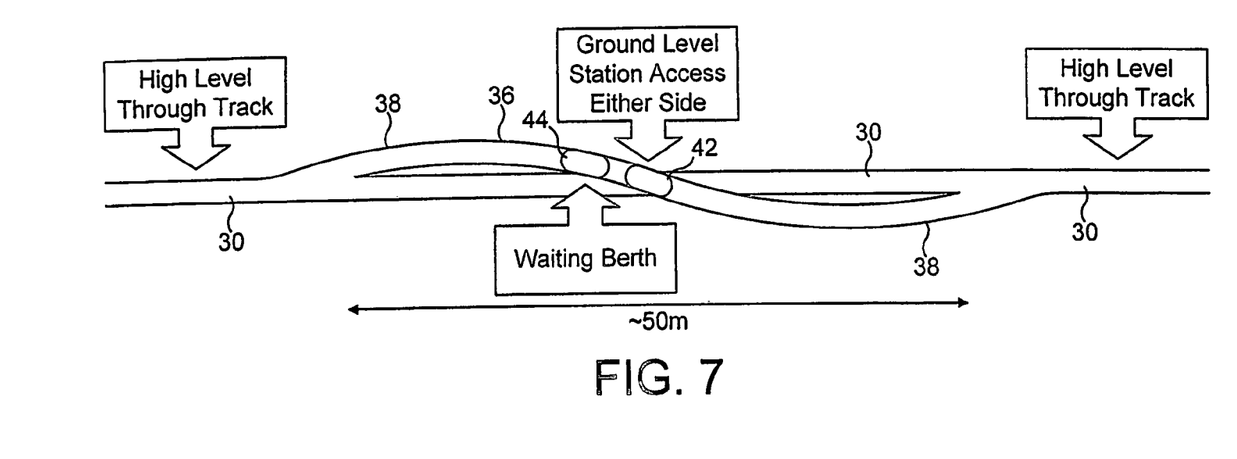
FIG. 7 shows a third schematic station configuration.

FIG. 7 shows a station configuration which is a modification of that shown in FIG. 4 and, again, similar reference numbers are used to designate similar features.

In the configuration of FIG. 7, the bypass track 36 leaves the main track 30 on one side, then passes beneath the main track 30 to rejoin on the other side. Thus, the station itself is situated directly beneath the main track 30 and, again, passengers may move from one side to the other of both the main track 30 and the bypass track 36 by passing beneath the deceleration and acceleration portions 38.

The invention claimed is:

1. A personal rapid transit system comprising a dedicated guideway on which individual steered passenger vehicles travel between stations, a station of the system comprising a portion of the guideway bounded on at least one side by a platform, the width of the guideway portion being sufficient for traveling vehicles of the system to travel along a transit path in normal travel direction of the vehicles unobstructed by vehicles parked on the guideway against the platform, the platform extending generally parallel to the transit path and comprising a plurality of bays for receiving parked vehicles, each bay being defined by a respective parking section of the platform edge and accessible only via a dedicated exit path off of the guideway for a corresponding steered vehicle, which parking section extends obliquely to the transit path, whereby the same steered vehicle of the system can move from and return to the transit path while maintaining a forward travel direction of the vehicle, and park against the parking section of the platform edge of a respective one of the bays by turning from the transit path through an acute angle, the return of the same steered vehicle to the transit path only via a dedicated re-entry path different from the exit path, the parking sections of adjacent bays being connected to each other by a transition section which extends from the front end of one of the parking sections to the rear end of the other.

2. A personal rapid transit system as claimed in claim 1, in which the transit path and the bays are provided on a common continuous surface of the guideway portion.

3. A personal rapid transit system as claimed in claim 1, in which the guideway portion of the station comprises a bypass branched from a main guideway of the system.

4. A personal rapid transit system as claimed in claim 1, in which the parking section of each bay is inclined at an angle of less than 45 degrees to the transit path.

5. A personal rapid transit system as claimed in claim 4, in which the angle of inclination of each parking section is not less than 10 degrees and not more than 20 degrees.

6. A personal rapid transit system as claimed in claim 1, in which each transition section is concavely curved with a radius of curvature greater than the radius of the minimum turning circle of vehicles of the system.

7. A personal rapid transit system as claimed in claim 1, in which the parking section of each bay has a length which is able to accommodate no more than one vehicle of the system.

8. A personal rapid transit system as claimed in claim 1, in which the parking sections extend substantially parallel to each other.

9. A personal rapid transit system as claimed in claim 8, in which the spacing between adjacent parking sections is not less than the width of vehicles of the system.

10. A personal rapid transit system as claimed in claim 1, wherein a length of each parking section substantially equal to or less than a length of a steered vehicle.

11. A personal rapid transit system comprising a dedicated guideway on which individual steered passenger vehicles travel between stations, a station of the system comprising a portion of the guideway bounded on at least one side by a platform, the width of the guideway portion being sufficient for traveling vehicles of the system to travel along a transit path in normal travel direction of the vehicles unobstructed by vehicles parked on the guideway against the platform, the platform extending generally parallel to the transit path and comprising a plurality of bays for receiving parked vehicles, each bay being defined by a respective parking section of the platform edge and accessible only via a dedicated exit path off of the guideway for a corresponding steered vehicle, which parking section extends obliquely to the transit path, whereby the same steered vehicle of the system can move from and return to the transit path while maintaining a forward travel direction of the vehicle, and park against the parking section of the platform edge of a respective one of the bays by turning from the transit path through an acute angle, the return of the same steered vehicle to the transit path only via a dedicated re-entry path different from the exit path, the parking sections of adjacent bays being connected to each other by a transition section which extends from the front end of one of the parking sections to the rear end of the other, wherein the personal rapid transit system comprises a main track along which vehicles of the system travel between a departure station and a destination station, and wherein the station is provided on a bypass track which is branched from the main track, the bypass track extending through the station at a level below that of the stretch of the main track which passes through the station.

12. A personal rapid transit system as claimed in claim 11, in which the bypass track leaves the main track to one side of the main track and joins the main track on the other side.

13. A personal rapid transit system as claimed in claim 12, in which the station is situated beneath the main track.

14. A personal rapid transit system as claimed in claim 11, in which a platform is situated adjacent the bypass track on both sides of the bypass track.

15. A personal rapid transit system as claimed in claim 11, in which the bypass track is branched from and rejoins the main track on the same side of the main track.

16. A personal rapid transit system as claimed in claim 15, in which two bypass tracks are provided, one on each side of the main track.

17. A personal rapid transit system as claimed in claim 16, in which a platform is situated between the branch tracks.

18. A personal rapid transit system as claimed in claim 11, wherein a length of each parking section substantially equal to or less than a length of a steered vehicle.

19. A personal rapid transit system comprising a dedicated guideway on which individual steered passenger vehicles travel between stations, a station of the system comprising a portion of the guideway bounded on at least one side by a platform, the width of the guideway portion being sufficient for traveling vehicles of the system to travel along a transit path in normal travel direction of the vehicles unobstructed by vehicles parked on the guideway against the platform, the platform extending generally parallel to the transit path and comprising a plurality of bays for receiving parked vehicles, each bay being defined by a respective parking section of the platform edge and accessible only via a dedicated exit path off of the guideway for a corresponding steered vehicle, which parking section extends obliquely to the transit path, whereby the same steered vehicle of the system can move from and return to the transit path while maintaining a forward travel direction of the vehicle, and park against the parking section of the platform edge of a respective one of the bays by turning from the transit path through an acute angle, the return of the same steered vehicle to the transit path only via a dedicated re-entry path different from the exit path, the parking sections of adjacent bays being connected to each other by a transition section which extends from the front end of one of the parking sections to the rear end of the other, wherein the personal rapid transit system comprises a main track along which vehicles of the system travel between a departure station and a destination station, and wherein two bypass tracks are branched from the main track on opposite sides of the main track, the bypass tracks extending through the station.

20. A personal rapid transit system as claimed in claim 19, in which a bridge extends over the main track to connect platforms disposed beside the bypass tracks.

21. A personal rapid transit system as claimed in claim 20, in which the platforms are disposed on the sides of the bypass tracks situated away from the main track.

22. A personal rapid transit system as claimed in claim 19, in which the main track runs past the station in a culling.

23. A personal rapid transit system as claimed in claim 19, wherein a length of each parking section substantially equal to or less than a length of a steered vehicle.

* * * * *